United States Patent [19]
Anderson

[11] 4,437,161
[45] Mar. 13, 1984

[54] MEDICAL IMAGING APPARATUS
[75] Inventor: William Anderson, Glenview, Ill.
[73] Assignee: Siemens Gammasonics Inc., Des Plaines, Ill.
[21] Appl. No.: 278,481
[22] Filed: Jun. 29, 1981
[51] Int. Cl.³ .......................... G06F 15/42; H04N 5/14
[52] U.S. Cl. .................... 364/414; 358/105; 358/111; 378/901; 382/6; 382/54
[58] Field of Search .................... 364/414, 415; 382/6, 382/54; 358/93, 105, 111; 378/901; 377/1, 2, 17, 39

[56] References Cited
U.S. PATENT DOCUMENTS

| | | | |
|---|---|---|---|
| 4,228,505 | 10/1980 | Wagner | 364/414 |
| 4,262,306 | 4/1981 | Renner | 358/105 |
| 4,288,815 | 9/1981 | Miles | 358/105 |
| 4,296,436 | 10/1981 | Achiha | 358/105 |
| 4,323,973 | 4/1982 | Greenfield | 382/6 |
| 4,335,427 | 6/1982 | Hunt et al. | 382/54 |
| 4,364,087 | 12/1982 | Storey et al. | 358/105 |

OTHER PUBLICATIONS

Siemens Corporation, Iselin, New Jersey, "Scintiview II", Brochure RR 1180 10M529.

Primary Examiner—Errol A. Krass
Attorney, Agent, or Firm—Karl F. Midle, Jr.; Andrew G. Rodau

[57] ABSTRACT

The apparatus contains a detector for detecting radiation emitted from an object under examination, and a device associated therewith for forming an imaging signal. The imaging signal is composed of a sequence of individual image signals each of which represents an individual radiation image of the object under examination. The imaging signal comprises a first individual image signal and second individual image signals following the first individual image signal. The apparatus also contains a signal processing circuit for processing the imaging signal and for forming a display signal thereof, and a display device for receiving the display signal and for displaying a sequence of images of the object under examination. In particular, the signal processing device basically contains three functional elements, that is a storage device, a subtractor, and an evaluation circuit. The storage device is provided for storing the first individual image signal, thereby forming a reference image signal. The subtractor subtracts the reference image signal from each of the second individual image signals. Thereby it forms a difference imaging signal composed of a sequence of individual difference image signals. The monitoring device receives the difference imaging signal. It determines whether a portion of each of the second individual image signals is different from the reference image signal. If so, it issues a change-of-image signal which is indicative of a change of image intensity distribution. In X-ray examinations of a patient, for instance, where a contrast medium is applied to the patient, such change may be caused by the appearance of the contrast medium in the radiation image.

14 Claims, 14 Drawing Figures

| THRESHOLD T | NUMBER n* | EVALUATION | SIGNAL |
|---|---|---|---|
| 25 | 9,983 | MOTION OF PATIENT | PMS |
| 235 | 221 | { CONTRAST MEDIUM INTRODUCED | CMS |
FIG. 5
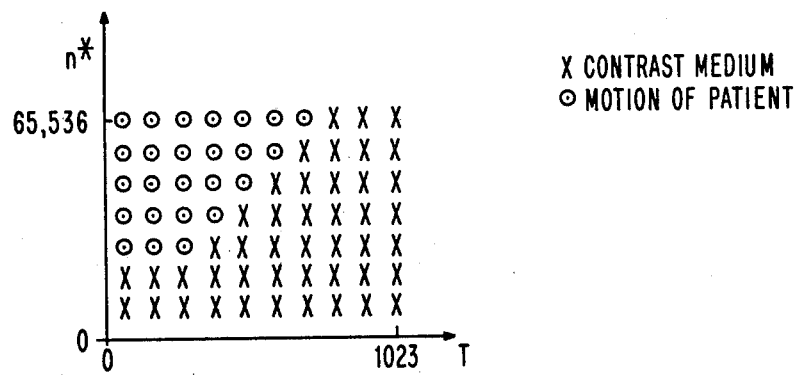
FIG. 6
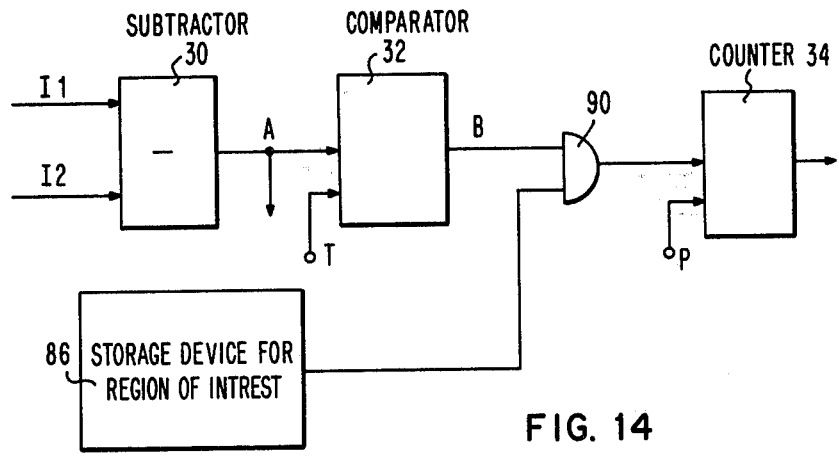
FIG. 14

4,437,161

MEDICAL IMAGING APPARATUS

CROSS-REFERENCE TO RELATED APPLICATION

This invention relates to the same technical field as the commonly-owned, co-pending application by Ivan Jazbec entitled "Medical Imaging Apparatus", Ser. No. 278479, filed on the same day as this application.

BACKGROUND OF THE INVENTION

1. Field of the Invention

This invention generally relates to the acquisition and processing of images in the medical field. More particularly this invention relates to a medical imaging apparatus which contains a detector for detecting radiation emitted from an object under examination, signal forming means associated with the detector for forming an imaging signal composed of a sequence of individual image signals each representing an individual radiation image of the object under examination, a signal processor for processing the imaging signal and for forming a display signal thereof, and a display device receiving the display signal for displaying a sequence of images of the object under examination. Still more particularly, this invention relates to a medical imaging apparatus for digital radiography. Still more particularly, this invention relates to a nuclear medicine imaging apparatus and an X-ray examination apparatus.

2. Description of the Prior Art

In the brochure RR 1180 10M529 "Scintiview II" by Siemens Corporation, Iselin, N.J., there is disclosed a medical imaging apparatus which is designed to display nuclear medicine images that are acquired, for instance, from the heart of a patient. A radioisotope is supplied to the patient, and the gamma rays or X-rays emitted from the patient's body are detected by a radiation detector. The output of this detector is processed by a signal processing device and finally displayed on a screen. The medical apparatus is equipped with a recording device such as a floppy-disk system in order to store programs and patient data.

One problem associated with medical imaging is the start of the recording during the imaging process. This problem is not only relevant in X-ray and ultrasound examinations, but also in nuclear medicine. Recording could be started manually by pressing a push button. Yet, especially in high recording rates, the human delay time may cause loss of recorded information. The recording process should be started when the tracer or contrast medium enters the imaging field. A start signal given too early would result in wasted storage capacity. Since the human delay time cannot be avoided, it would be of advantage to provide electronic means which automatically provides for a start-up. At least for higher recording rates, the data recording should be improved in such a way that a start signal is given at the appropriate point of time.

SUMMARY OF THE INVENTION

1. Objects

It is an object of this invention to provide a medical imaging apparatus which detects small intensity changes in images taken from a patient.

It is another object of this invention to provide a medical imaging apparatus which allows for an automatic start-up of at least one recording process of an image.

It is still another object of this invention to provide a medical imaging apparatus which is not subject to the reaction time of a human operator in starting a recording process.

It is still another object of this invention to provide a medical imaging apparatus which allows for an automatic termination of a recording process of an image.

It is still another object of this invention to provide a medical imaging apparatus which very efficiently makes use of a storage device for storing at least one image of a patient under examination after a contrast medium or tracer has entered the image field of interest.

2. Summary

According to this invention, first a reference image is stored. Then difference images are formed by subtracting the reference image from subsequent images contained in the imaging signal. These imaging signals may be represented by live images or recorded images. Each difference image is scanned or investigated to determine the number of image elements or pixels the intensities of which are above a preset or operator selectable threshold. If the number of pixels having intensities above the predetermined threshold reaches a certain preset or operator selectable value, an output signal from the circuit occurs. This output signal is used to initiate the recording of the subsequent images in a storage device such as a memory. Thus, an automatic start-up of the recording process is achieved.

The storage capacity of the storage device can be kept limited since data recording starts only when changes of the image occur, that is, in particular when a contrast medium introduced into the patient becomes visible in the images. Another benefit of the automatic start-up of the recording process is the elimination of the human reaction time in determining differences between the reference image and the following (live or recorded) images.

The foregoing and other objects, features and advantages, of the invention will be apparent from the following more particular description of preferred embodiments of the invention, as illustrated in the accompanying drawings.

BRIEF DESCRIPTION OF THE DRAWINGS

In the drawings

FIG. 5 is a table illustrating determinations made by the evaluation circuitry shown in FIG. 2;

FIG. 6 is a diagram illustrating again the operation of the evaluation circuitry shown in FIG. 2;

FIG. 14 is a block diagram of circuit for generating a region of interest in combination with signal processing circuitry applicable in the apparatus of FIG. 1.

DETAILED DESCRIPTION OF THE PREFERRED EMBODIMENTS

Figure 1:
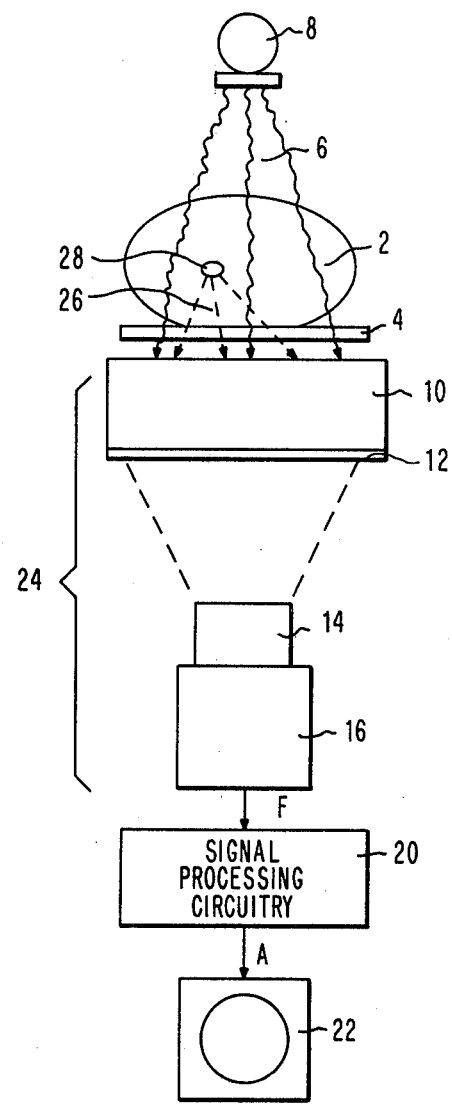
FIG. 1 is a schematic drawing of a medical imaging apparatus according to the invention which operates with X-rays or with nuclear radiation.

A medical imaging apparatus is illustrated in FIG. 1. In this apparatus a patient 2 lies on an examination table 4.

In a first modification, the patient 2 is exposed to X-rays 6 which are emitted from an X-ray source 8. The X-rays passing through the patient 2 and the examination table 4 are received by an image intensifier 10 which serves as a detector for detecting the received intensity distribution. The image on the visible light screen 12 of the image intensifier 10 is received by the lens system 14 of a vidicon tube which is part of a TV camera 16. The TV camera 16 forms an imaging signal F according to the radiation images. The imaging signal F is composed of a sequence of individual image signals, each defining one complete image or interlace scanned "frame" of the screen 12. This sequence corresponds to a sequence of individual radiation images of the patient 2 under examination. The imaging signal F is fed into a signal processing and evaluation circuitry 20. This circuitry 20 forms a display signal A out of the imaging signal F. The display signal A is received by a display device 22 which displays on its screen a sequence of clear images of the patient 2 under examination.

The image intensifier 10 and the TV camera 16 may be designed as one unit 24. Such X-ray TV system units 24 are commercially available, one such unit being sold under the trademark "VIDEOMED N", by Siemens AG, Berlin and Munich, West Germany.

In a second modification, the principles of the present invention are applied to nuclear medicine images. In order to illustrate this in FIG. 1, it is assumed that a tracer or a certain dose of radionuclides has been supplied to the patient 2. Thus, the patient's body becomes the source of radiation. In particular, radiation 26, that is either beta radiation or gamma rays, is emitted from an organ 28 of the body. The organ 28 defines a region of interest which is to be examined.

For the following description, it is assumed that a contrast medium has been supplied to the patient 2 and that the position and movement of such contrast medium will be investigated by X-ray imaging. Alternately, it may be assumed that a tracer emitting nuclear radiation has been supplied to the patient 2, and that the flow of the tracer through certain organs, such as the patient's heart, will be investigated by nuclear medical imaging. In this latter case, the unit 24 will be substituted by a unit that converts the nuclear image received by the detector 10 into a sequence of electric image signals. Such a unit may contain a conventional Anger camera.

Figure 2:
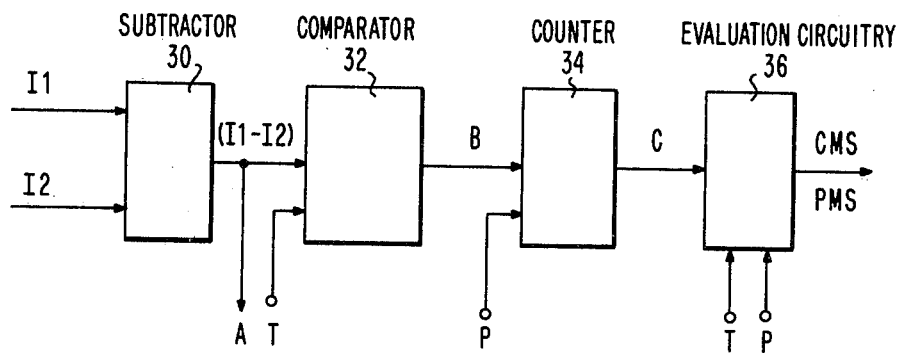
FIG. 2 is a block diagram of a first basic embodiment of signal processing circuitry applicable in the apparatus of FIG. 1.

In FIG. 2 a portion of the signal processing circuitry 20 of FIG. 1 is illustrated in more detail. This circuitry represents a first embodiment of the invention. The illustrated circuit contains an image subtractor 30, in particular a pixel intensity subtractor, a comparator 32 connected to the output of the subtractor 30, a counter 34 connected to the output of the comparator 32, and an evaluation circuitry 36 which in turn is connected to the output of the counter 34. Comparator 32 and counter 34 typically comprise a monitoring means.

To the subtractor 30 are applied a first image signal I1 and a second image signal I2. The first image signal I1 is a reference image signal. It is the first of the individual image signals contained in the imaging signal F. As will be explained in detail later with reference to FIG. 7, this first individual image signal I1 is a signal which has been received from the TV camera 16 and which has been stored in a storage device, such as a digital memory. In view of its function, this reference image signal I1 may also be termed as a "recorded mask". The second image signal I2 is one of the individual image signals following the first individual image signal in the imaging signal F. In other words, it is the live image signal obtained from the TV camera 16. As will be explained later, this second image signal I2 may also be a recorded image signal if a playback feature of the illustrated medical imaging apparatus is used.

The reference image signal I1 forms a first or reference image. For instance, this image can be formed by $256 \times 256 = 65,536$ individual image elements or pixels. Each of these pixels may assume any of $1,024 = 2^{10}$ intensity levels, that is in this example, the intensity range is divided between dark (0) and bright (1023) into 10 bits ranging from 0 to 1023. The same also applies to the second image signal I2. It has also 65,536 pixels, each having 1,024 possible intensity levels.

Figure 3:
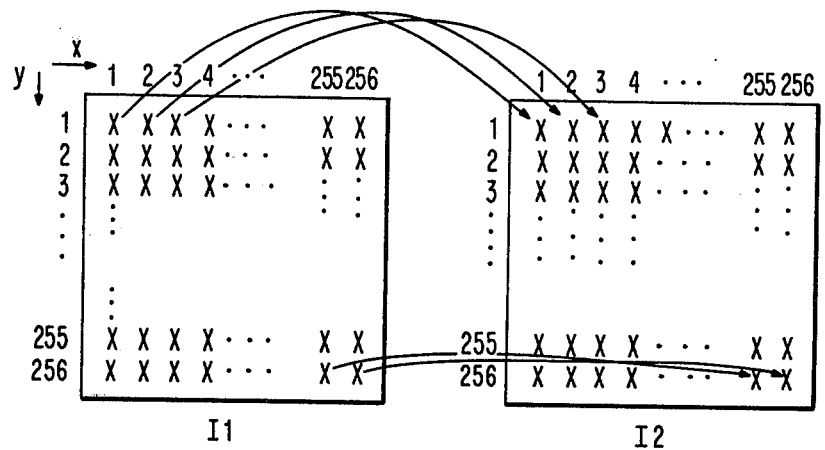
FIG. 3 is a representation of two individual images illustrating the operation of the subtractor shown in FIG. 2.

The subtractor 30 subtracts pixel by pixel the reference signal intensity of the signal I1 from the live signal intensity of the signal I2. This intensity subtraction pixel by pixel is illustrated schematically in FIG. 3, which represents the display reference image signal I1 and one of the second individual image signals I2. It will be noted, for instance, that the intensity of the pixel having the x,y coordinates (255, 256) of the reference signal I1 is subtracted from the intensity of the corresponding pixel having the coordinates (255,256) of the second image signal I2. The output signal A of the subtractor 30 is applied to the display device 22.

The output signal A of the subtractor 30 should be the same—for instance, it should be zero for all 65,536 pixels (except for noise)—if the live image signal I2 and the reference image signal I1 are equal to each other. A change between the reference image signal I1 and the second image signal I2 can primarily occur for two reasons:

(a) The patient 2 has moved, or
(b) A contrast medium has flowed through the image portions of the patient 2 who is assumed to have remained still.

As mentioned earlier such a contrast medium may have been supplied to an organ of the patient on purpose, for instance to a blood vessel such as a vein, between the first and the second image. In some applications, a relatively long time period may elapse between the first and the second image. It is of interest to determine if there has been a change between the reference image signal I1 and any of the sequential second image signals I2 and what may have caused such change.

In order to make such a determination, the comparator 32, the counter 34, and the evaluation circuitry 36 are provided in the embodiment of FIG. 2.

Figure 4:
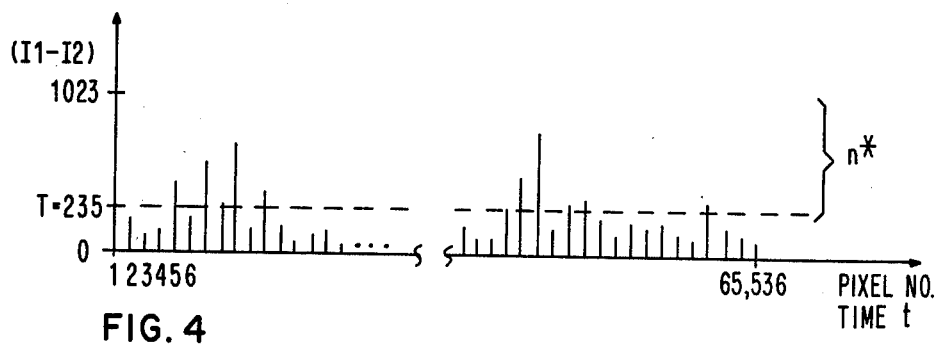
FIG. 4 is a diagram illustrating the operation of the comparator shown in FIG. 2.

The comparator 32 is a threshold detector. It has a predetermined threshold T which may either be fed in or stored manually or by an automatic start circuit, as will be explained later. For the sake of illustrating an example, it is assumed that the threshold is T=235. According to FIG. 4, the comparator 32 compares the intensity difference (I2-I1) of each of the 65,536 pixels of the difference image signal with the predetermined threshold T=235. Each time that the threshold T is exceeded by the intensity difference (I2-I1), the comparator 32 delivers a counting pulse to the next stage which is the counter 34. The output signal of the comparator 32 is designated as B. With each output pulse in the output signal B of the comparator 32, there is added a 1 into the counter 34. In FIG. 4 the individual difference image signal (I2-I1) is illustrated for 256×256=65,536 pixels of a second individual image I2. The abscissa indicating the pixel number also corresponds to the time t. In FIG. 4 it is assumed that in the field from pixel no. 1 to pixel no. 65,536 a total of $n^*=109$ pixels are larger than the threshold T=235. That means that the comparator 32 will deliver a total of 109 counting pulses to the counter 34 as long as the second image I2 is worked on. It will be noted that the counter 34 will not receive any information about how large the intensity difference of the pixels is with respect to the threshold T.

The counter 34 has a predetermined counting value P. This predetermined value P may be either preset or it may be selected by the operator of the medical imaging apparatus.

As mentioned before, in the example shown in FIG. 4, there are $n^*=109$ pixels out of 65,536 the intensities of which are larger than the threshold intensity T=235. As compared to a case where none of the pixel intensities is above the threshold T (the patient 2 has not moved between taking the first and the second image signal and no contrast medium or tracer has been applied to the patient), this constitutes a specific and characteristic contrast change. This change is easily visible on the screen of the display device 22 by means of the display signal A. Since the $n^*=109$ pixels represent a relatively small number, it must be expected that their origin goes back to the introduction of a contrast medium rather than to a motion of the patient 2. A motion of the patient 2 would certainly cause a larger number $n^*$ of intensities exceeding the threshold T.

This is schematically illustrated in the table of FIG. 5. Here it is first assumed that the threshold T is relatively low, that is T=25, and that the number $n^*$ of pixel intensities exceeding the threshold T is large $n^*=9,983$. In this case, a considerable portion of the total image, namely 9,983 out of 65,536 pixels, has a changed intensity. This is certainly due to a motion of the patient 2.

The results reflected in the table of FIG. 5 may be summarized as follows: If there is a comparatively low threshold T, but a large number $n^*$ of pixels having a difference intensity (I2-I1) exceeding the threshold intensity T, it must be assumed that a motion of the patient 2 has occured between the reference signal image I1 and the second image signal I2. If such a result is found, the evaluation circuitry 36 will emit a patient motion signal PMS (motion detection). Conversely, if there is a comparatively high threshold T (for instance 235), but only a low number $n^*$ (for instance 221) of pixels above the threshold T, it has to be assumed that a contrast change has occured between the first and the second image by introduction of an object into the radiation path, for instance by introduction of an injection needle or by injection of a contrast medium into the bloodstream of the patient 2. In this case, the evaluation circuitry 36 will emit a contrast medium signal CMS. This signal CMS in particular is useful to indicate or detect a contrast medium in the image.

According to FIG. 2 such determination is made by the evaluation circuitry 36. The evaluation circuitry 36 obtains as input signal the count rate C at the end of each difference image. In order to make a correct analysis, the evaluation circuitry 36 is also supplied with the threshold value T and the predetermined value P of the counter 34. The evaluation circuitry 36 may be, for instance, a microprocessor.

The patient motion signal PMS may be applied as a command "record a new mask" or "record a new reference image I1" since the originally taken reference image signal should no longer be used due to the motion of the patient 2 just determined. The contrast medium signal CMS at the output of the evaluation circuitry 36 may be used for an automatic start feature as will be explained later in detail with reference to FIG. 7.

The data upon which an analysis of the number $n^*$ is based, thereby taking into consideration the values T and P, depend largely on properties of the individual medical imaging apparatus, but also on the flow rate of the applied contrast medium or tracer, on the size of the organ under examination, and on other factors. These data should be determined in experiments.

For the purpose of evaluation, the evaluation circuitry 36 may contain a storage means such as a memory. This storage means may have stored a data matrix which is a result of experiments and which may look like the data matrix schematically illustrated in FIG. 6. In FIG. 6 a diagram is shown in which the threshold T is the abscissa and the number $n^*$ is the ordinate. The diagram is in the form of at table. Stars mark the area where based on experiments a change of contrast is due to the appearance of a contrast medium or tracer, whereas small circles mark the area in which a change of contrast is due to a motion of the patient. The evaluation circuitry 36 may have stored such table.

Figure 7:
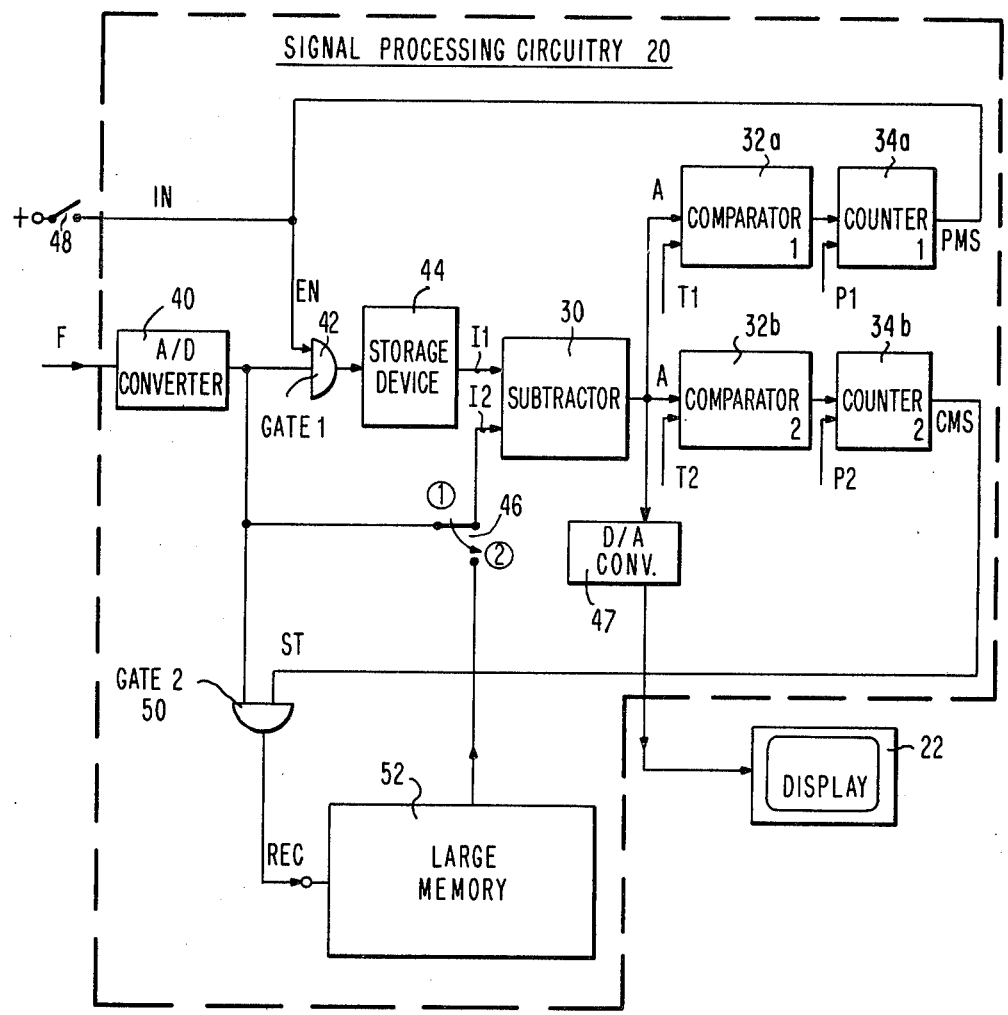
FIG. 7 is a block diagram of a more detailed embodiment of signal processing circuitry for processing signals received from a TV camera shown in FIG. 1.

In FIG. 7 another embodiment of a signal processing circuitry is illustrated. Here it is assumed that the imaging signal F is an analog signal. It is applied to an analog-to-digital converter 40. The digitized imaging signal F is directed via a first gate 42 to a storage device 22. The gate 42 is controlled by an enabling command EN. The enabling command EN starts the recording of a first mask or of a new mask in the storage device 44. This storage device 44 is used for storage of the aforementioned first individual image signal as the first mask and for storage of more masks. The storage device 44 may be a single frame memory. The storage device 44 serves to store the reference image signal I1. This signal I1 is subsequently fed into one input of the subtractor 30.

The output of the A/d convertor 40 is connected via a double-throw switch 46 to the other input of the subtractor 30. In the illustrated first position of the switch 46, the live second individual image signals I2 are directly applied to the subtractor 30.

The output signal A of the subtractor 30 is applied to a digital-to-analog converter 47 which in turn supplies the display device 22.

The difference imaging signal A issued by the subtractor 30 is also applied to a first combination consisting of a first comparator 32a and a first counter 34a. In accordance with FIG. 2, the first comparator 32a has a first threshold T1, and the first counter 34a has a predetermined first counting value P1. The first combination 32a, 34a is used for motion detection. The values of T1 and P1 are such that the first counter 34a delivers an output signal or patient motion signal PMS whenever a change of contrast is due to a motion of the patient 2.

It is an important feature of the signal processing circuitry 20 that the patient motion signal PMS is used as an enabling signal EN for initiating the storage of data in the storage device 44. When the motion detection circuit (first comparator 32a, first counter 34a) has determined that the patient 2 has moved between the first image I1 and the second image I2, the enable signal EN is applied to the first gate 42. As a consequence, the storage device 44 will begin to store the next image coming from the A/D converter 40, thereby overriding the formerly stored reference image signal I1. Thus the reference image signal I1 is automatically replaced by a new one. This will occur each time a motion of the patient 2 is detected by the motion detection circuit 32a, 34a.

The storage device 44 will also begin to store an image when an initial start signal IN is given to the first gate 42 as an enabling signal EN. This can be performed manually by means of a push button 48 that connects a voltage source to the first gate 42. In other words, by pushing the push button 48, the storage device 44 is enabled at the beginning of the examination procedure to form the first reference image signal I1. The signal processing circuitry 20 illustrated in FIG. 7 has a playback feature which is represented by a second gate 50, by a large storage device or memory 52 and by the double throw switch 46. The large memory 52 is designed to sequentially store large numbers of images coming from the A-to-D converter 40 via the second gate 50. The large memory 52 automatically begins to record images when it receives signals on its recording input REC. This occurs when a start signal ST is applied to the second gate 50.

It is also an important feature of the signal processing circuitry 20 illustrated in FIG. 7 that the contrast medium signal CMS is used as a starting signal ST for starting recording of images in the large memory 52. The contrast medium signal CMS is developed by a second comparator 32b and a second counter 34b in accordance with FIG. 2. The contrast medium detection circuitry 32b, 34b is connected to the output of the subtractor 30. In accordance with FIG. 2, the second comparator 32b has a second threshold T2, and the second counter 34b has a second counting value P2.

When the contrast medium appears in the second images I2 (the switch 46 is still in its first position), the signal CMS will be issued. This signal CMS is used as a control signal or start signal ST for the second gate 50 so that recording of the images containing the contrast medium or tracer can begin immediately. Application of the contrast medium detection circuit 32b, 34b 50 avoids a waste of storage capacity in the large memory 52. The large memory 52 does not have to record during the time period between taking the first storage image I1 (shortly before or after the injection of a tracer) and the appearance of the contrast medium on the display device. It should be mentioned that the storage device 44 may be part of the large memory 52.

The large memory 52 should have a large storage capacity in cases where high frame or image rates are applied, for instance in cardiac examination. If a high image rate is not required or if the automatic starting feature is not desired, a push button 54 (see FIG. 8) may be used for supplying the starting signal ST. However, in such a case the human reaction time from observing the arrival of the contrast medium or tracer to the pressing of the push button 54 has to be taken into consideration.

It should be pointed out that the values T2 and P2 will generally be selected differently from the values T1 and P1, respectively. The values T1, P1 and T2, P2 may be manually set or automatically adjusted.

The double throw switch 46 may be positioned by an operator or by a control unit (not shown). In the illustrated position no. 1, the subtractor 30 performs a subtraction of the stored image singal I1 from the individual real time image signals I2. In the other position, that is in position no. 2, the subtractor 30 subtracts the stored image signal I1 from each of the sequentially stored images in the large memory 52. Thus, the switch position no. 2 is used for playback purposes.

It should also be mentioned that the illustrated signal processing circuitry 20 may be modified such that the large memory 52 does not store the real time image signals I2 but the difference imaging signal A=(I2-I1) received from the subtractor 30.

Figure 8:
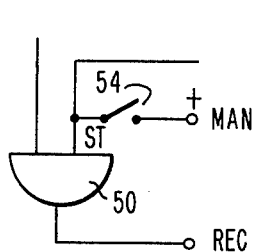
FIG. 8 is a block diagram of a modified portion of the circuitry of FIG. 7.

In FIG. 8 is illustrated that the second gate 50 may be fed by a manually given start signal MAN. For this purpose a push button 54 is provided connecting the second input of the second gate 50 to a voltage source. This feature may be used if a low frame or image rate is applied. With such a low image rate, the storage capacity of the large memory 52 cannot easily be exhausted, if only few images shall be stored.

Figure 9:
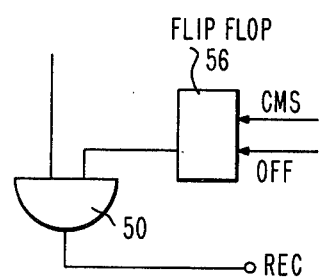
FIG. 9 is a block diagram of another modified portion of the circuitry shown in FIG. 7.

In FIG. 9 is shown that the second gate 50 may also be controlled by a flip-flop 56. Once the flip-flop 56 is started, it remains in an ON position. It may be turned off by an OFF signal issued by a control unit (not shown). This OFF signal may be given after a certain number of images has been stored in the large memory 52 or after the complete storage capacity of the large memory 52 has been exhausted.

The circuitry illustrated in FIG. 7 has some particular advantages for heart examinations. It will be assumed that a contrast medium has been applied to the patient and that this contrast medium enters the right ventricle of the heart. As soon as the contrast medium enters the field of imaging, the second gate 50 is automatically turned on for recording the following images in the large memory 52. When the contrast medium has passed through the field of imaging and passes through one lung, the contrast medium signal CMS becomes zero. As a result the second gate 50 is turned off. This saves storage capacity in the large memory 52. Recording in the large memory 52 is turned on again by aid of the start signal ST when the contrast medium (now coming from the lung) enters the field of imaging in order to pass into the left ventricle of the heart. Recording can now be continued until the memory capacity is exhausted or the contrast medium leaves the field of imaging. As mentioned before, also in this case a manual activation of the recording in the large memory 52 is possible by means of the switch 54.

Figure 10:
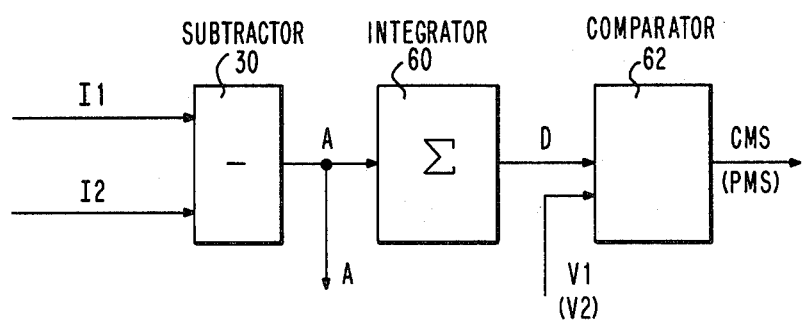
FIG. 10 is a block diagram of a second basic embodiment of a portion of a signal processing circuitry applicable in the apparatus of FIG. 1.
Figure 11:
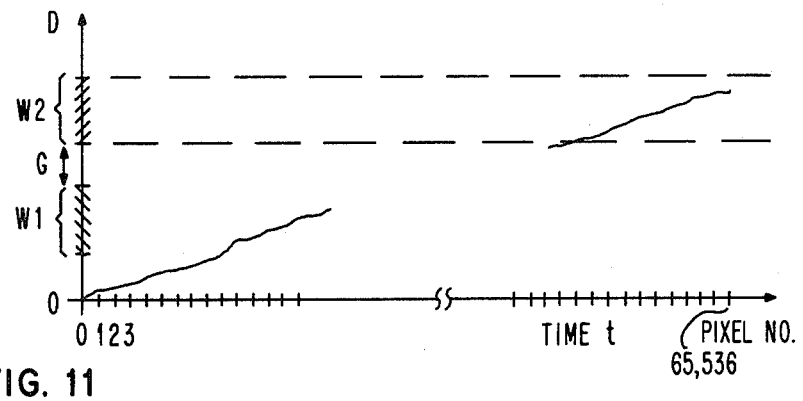
FIG. 11 is a diagram illustrating the operation of the integrator shown in FIG. 10.

In FIGS. 10 and 11 the principle of a second embodiment of the signal processing circuitry 20 as illustrated. In this second embodiment there is also provided a subtractor 30 which subtracts pixel by pixel (see FIG. 3) the intensity of a reference image signal I1 from the intensity of a live image signal I2. It is again assumed that for each reference image and for each live image there are 65,536 digital output values in the output signal A. Each digital output value is one of the numbers 0 to 1023 and characterizes the intensity of the particular pixel. The difference image signal A from the subtractor 30 is fed into a summation device or integrator 60. This integrator 60 adds up the 65,536 intensity values of the pixels of each difference image, as illustrated in FIG. 11. In FIG. 11 is shown the momentary sum D of the counts as a function of the pixel number or as a function of the time t. The output signal D of the integrator 60 indicating the intensity sum is applied to a comparator 62 as soon as pixel number 65,536 has been arrived at.

In FIG. 11 two windows W1 and W2 are illustrated. If the count sum or output signal D at the last pixel number 65,536 falls into the upper window W2, then these counts are due to a motion of the patient. This is assumed in FIG. 11. If the count sum or output signal D at the last pixel number 65,536 falls into the lower window W1, then the intensities of the pixels may be due to a contrast medium which has been applied to the patient 2 and which has entered the imaging field.

It will be noted in FIG. 11 that the first window W1 is elevated above the zero level D=0. This takes into account noise which may exist and which will also be added up during the summation process. The two windows W1 and W2 may be selected to be adjacent to each other. But there may also be a gap G between the windows W1 and W2. The size and position of the windows W1 and W2 will be determined by experiments. There may be an area or gap G inbetween where it cannot be determined whether the corresponding count rate (output signal D) is due to a motion of the patient 2 or to a contrast medium entering the field of observation.

In addition to the output signal D, the comparator 62 of FIG. 10 receives an input signal V1 or V2, which represents either the lower window W1 or the upper window W2, respectively. The comparator 62 issues a contrast medium signal CMS if the sum D at the end of its frame is located within the first window W1. If a higher window W2 is selected, the comparator 62 issues a patient motion signal PMS if the input signal D at the end of the image frame is located within the second window W2.

As in FIG. 7, the signal CMS can be used for an automatic start operation, and the signal PMS can be used for starting the recording of a new reference image. It should be mentioned that if the signal CMS as well as the signal PMS are to be issued from the comparator 62, then two parallel comparator units or a specific evaluation circuit (not shown) are necessary. Such a double comparator evaluation circuit would be fed with both window signals V1 and V2.

Figure 12:
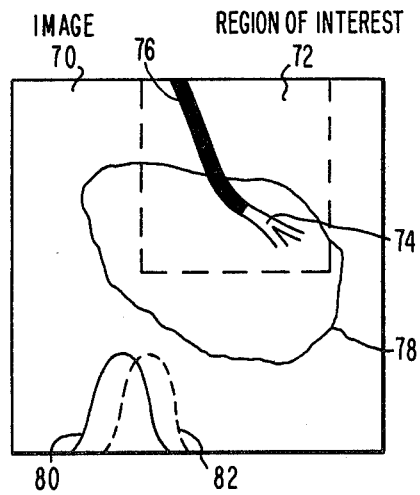
FIG. 12 is a sketch of an image obtained by the apparatus according to FIG. 1, said image having a particular region of interest.
Figure 13:
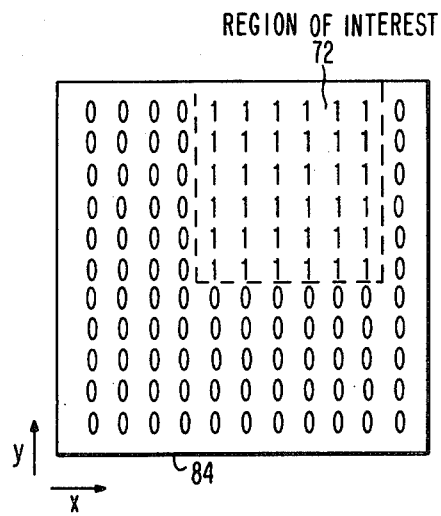
FIG. 13 is a binary image representation of the region of interest shown in FIG. 12.

In FIGS. 12 to 14 a method and a device for screening out a certain region or area of interest is illustrated. This method and device may preferably be applied in conjuntion with a signal processing circuitry 20 according to FIG. 2 or FIG. 10.

During the examination of a patient 2 there may be a smaller region of interest 72 in the image 70 which is displayed on the display device 22. This region of interest 72 may contain for instance the blood vessel 74 through which a contrast medium 76 enters the organ 78 under examination. This organ 78 may be, for instance, the heart of the patient 2.

Determination of a region of interest 72 improves the medical imaging apparatus with respect to patient motion. For illustrating an example, it is assumed that a bone 80 of the patient 2 is displayed in the image 70. If the patient 2 moves, the bone 80 will be displayed in a slightly different location 82. In other words, the motion of the bone will cause comparatively large intensity differences (I2-I1) in the output signal A of the subtractor 30. By the circuitry following the subtractor 30, this could erroneously be analyzed as the introduction of a contrast medium or tracer, and a signal CMS would be issued. By screening out the bone 80 and also its moved image 82, false signals CMS can be eliminated, provided that the region of interest 72 is outside the bone structure 80.

As is illustrated in FIG. 13, a mask 84 is formed which contains the region of interest 72. The region of interest 72 is represented by a field of logical 1's, whereas the surrounding area is represented by a field of logical 0's. Conversely, the field of interest 72 may be formed by logical 0's, whereas the surrounding area may be formed by logical 1's. These data are stored in a memory. The region of interest 72 is freely selectable by assigning 1's and 0's to the appropriate coordinates x and y.

In FIG. 14 an evaluation device containing a screening device is illustrated. It contains a storage device 86 for storing the coordinates x,y or the individual field numbers of the region of interest 72. Such storage device 86 may comprise an address discriminator circuit for determination of the lower and upper x and y coordinates of the region of interest 72. In other words, the area of interest 72 may be characterized by a lower and an upper x and by a lower and an upper y, provided that the area of interest 72 is rectangular. However, the area of interest 72 may also be irregular. If a memory is used as the storage device 86, the area of interest 72 may be outlined on a screen by aid of a light stick, whereupon the corresponding coordinate data will be stored in the memory. Such technique is well known in the art. The pulses coming out of the light pen indicate the addresses of the boundary of the area of interest 72. These addresses can be stored in the memory 86.

In accordance with FIG. 14, the screening device contains a gate 90 in the connection line between the comparator 32 and the counter 34. This gate 90 is controlled by the storage device 86. It is ON whenever a logic 1 characterizing the field of interest 72 is supplied from the storage device 86. Thus, only those pixels are counted in the counter 34 which lie in the area of interest 72. The supply of the mask including the area of interest 72 is performed synchronously with the data supply of the images I1, I2.

Instead in the connection line between the comparator 32 and the counter 34, the gate 90 may also be arranged in the connection line between the subtractor 30 and the comparator 32. It will be located such that, if so desired, only the area of interest 72 is displayed on the display device 22.

While the forms of the medical imaging apparatus herein describe constitute preferred embodiments of the invention, it is to be understood that the invention is not limited to these precise forms of assembly, and that a variety of changes may be made therein without departing from the scope of the invention.

What is claimed is:

1. In a medical imaging apparatus containing
means for detecting radiation emitted from an object under examination,
means associated with said detecting means for forming an imaging signal from said radiation, said imaging signal being composed of a sequence of individual image signals each representing an individual radiation image of said object under examination and said imaging signal containing a first individual image signal and second individual image signals following said first individual image signal;
signal processing means for processing said imaging signal and for forming a display signal thereof, and
display means for receiving said display signal and for displaying a sequence of images of said object under examination,
the improvement wherein said signal processing means comprises
storage means for storing said first individual image signal, thereby forming a reference image signal;
subtracting means for subtracting said reference image signal from each of said second individual image signals, thereby forming a difference imaging signal composed of a sequence of individual difference image signals; and
monitoring means receiving said difference image signal for determining whether a portion of each of said second individual image signals is different from said reference image signal, said monitoring means issuing a change-of-image signal indicative of a change of image intensity distribution.

2. The improvement according to claim 1, further comprising
(a) additional storage means for storing said second individual image signals; and
(b) means for initiating the storage of said second individual image signals in said additional storage means, said initiating means being controlled by said change-of-image signal.

3. The improvement according to claim 1, wherein said monitoring means comprises
(a) a comparator having a predetermined threshold for comparing said difference image signal with said threshold and producing an output pulse if said threshold is exceeded; and
(b) means associated with said comparator for counting said output pulses and for forming a corresponding count rate.

4. The improvement according to claim 3, wherein said counting means has a predetermined count value for comparing said count rate therewith.

5. The improvement according to claim 3, wherein said monitoring means has associated with it, evaluation circuitry associated with said counting means, said evaluation circuitry comparing said count rate at the end of each different image signal with a predetermined count rate, and said evaluation circuitry delivering said change-off-image signal when said count rate exceeds said predetermined count rate.

6. The improvement according to claim 1, wherein said monitoring means has associated with it,
a summation device fed by said difference image signal for integration of said individual difference image signals, said summation device having a predetermined integration value and issuing an integral signal after each individual difference image signal, and
a comparator connected to said summation device for comparing said integral signal with said predetermined integration value.

7. The improvement according to claim 6, wherein said predetermined integration value defines predetermined window.

8. The improvement according to claim 1, wherein said imaging signal is a digital imaging signal, and wherein said additional storage means is a digital memory.

9. The improvement according to claim 1, wherein said radiation is nuclear radiation received from a tracer which is applied to a patient.

10. The improvement according to claim 1, further comprising connecting means for applying said difference imaging signal to said display means.

11. In a medical imaging apparatus containing,
(a) means for detecting radiation emitted from an object under examination;
(b) means associated with said detecting means for forming an imaging signal from said radiation, said imaging signal being composed of a sequence of individual image signals each representing an individual radiation image of said object under examination and said imaging signal containing a first individual image signal and second individual image signals following said first individual image signal;
(c) signal processing means for processing said imaging signal and for forming a display signal thereof; and
(d) display means for receiving said display signal and for displaying a sequence of images of said object under examination,
the improvement wherein said signal processing means comprises,
(a) storage means for storing said first individual image signal, thereby forming a reference image signal;
(b) subtracting means for subtracting said reference image signal from each of said second individual image signals, thereby forming a difference imaging signal composed of a sequence of individual difference image signals;
(c) monitoring means receiving said difference imaging signal for determining whether a portion of each of said second individual image signals is different from said reference image signal, said monitoring means issuing a change-of-image signal indicative of a change of image intensity distribution;
(d) additional storage means for storing said second individual image signals; and
(e) means for initiating the storage of said second individual image signals in said additional storage means, said initiating means being controlled by said change-of-image signal, wherein said initiating means comprises a gate associated with said additional storage means for controlling the recording of said individual image signals in said additional storage means.

12. The improvement according to claim 11, wherein means for manually starting the storage of said second individual image signals are connected to said gate.

13. The improvement according to claim 12, wherein said starting means comprises a switch.

14. The improvement according to claim 12, wherein said starting means comprises a flip-flop.

* * * * *